United States Patent [19]

Grattoni et al.

[11] 4,387,392
[45] Jun. 7, 1983

[54] SYSTEM FOR TELEVISED RADIOSCOPY

[75] Inventors: Paolo Grattoni; Giorgio Quaglia; Cesare Fava; Giovanni Juliani, all of Turin, Italy

[73] Assignee: Consiglio Nazionale Delle Ricerche, Rome, Italy

[21] Appl. No.: 253,155

[22] Filed: Apr. 8, 1981

[30] Foreign Application Priority Data

Jan. 23, 1981 [IT] Italy .................... 19293 A/81

[51] Int. Cl.³ .......................................... H04M 5/32
[52] U.S. Cl. ................................. 358/111; 358/105; 358/107; 358/96; 378/99
[58] Field of Search ............... 358/111, 105, 106, 96, 358/166, 107; 250/416 T, 272, 314, 320, 321, 366; 378/99

[56] References Cited

U.S. PATENT DOCUMENTS

4,157,572 6/1979 Kennedy et al. .................. 358/111
4,204,225 5/1980 Mistretta ............................ 358/111
4,204,226 5/1980 Mistretta ............................ 358/111

Primary Examiner—Benedict V. Safourek
Assistant Examiner—Edward L. Coles
Attorney, Agent, or Firm—Bucknam and Archer

[57] ABSTRACT

An assembly for televised radioscopy is described which comprises a source of X-rays, a device for generating a visual signal corresponding to the image of the body organ in motion being examined and a monitor provided with a screen. The assembly comprises a detecting device which has an input to which the visual signal is supplied, at least one output which is intended to be connected to the input of said monitor, a first processing electronic transducer device capable of generating and overlapping a registering signal which is overlapped with the visual signal, the registering signal is capable of causing at least one tracing PR on the televised picture of the monitor, the tracing corresponding to at least one point of the contour of the image of the body organ in motion, the tracing PR having a luminosity different from the luminosity of the surrounding portion. The assembly comprises a second processing electronic device capable of supplying at the output an electric signal indicative of the amount of the displacement of the tracing PR starting from a reference point T which is fixed with respect to the televised picture of the monitor during the movement of the image of the same body organ and display and/or registering means connected to the output of the detecting means and capable of supplying a representation of the displacement of the point of the contour of the body organ being examined.

28 Claims, 13 Drawing Figures

SYSTEM FOR TELEVISED RADIOSCOPY

FIELD OF THE INVENTION

The present invention relates to an apparatus for detecting the movements of an organ of a human body and more specifically, to an apparatus to be used in an assembly for televised radioscopy. In the field of the study of the dynamics of the movements of the body organs and in particular, the heart and the vascular system, a great deal of progress has been achieved. These studies are of fundamental importance because on the basis of the analysis of the dynamic behavior of an organ, very important observations ca be made which are valuable to an understanding of the physiopathology of the same organ.

DESCRIPTION OF THE PRIOR ART

In the past, several apparatuses and devices have been proposed for the detection and registration of the movements or an organ and in particular, the movements of the profile of the heart (cardiac image). In a first stage, apparatuses have been developed for the roentgen-chemography in which behind the fluorescent screen of a radiographic apparatus, there is placed a plate of radioopaque material provided with one or more fissures which usually are horizontal and which are made or pre-disposed in a position substantially corresponding to the points of the contour or profile of the heart or another organ of which one wishes to detect the displacement. A photosensitive film is placed behind this plate and is allowed to slide along the vertical direction and with a constant velocity. These apparatuses permit to achieve a registration of the displacements of a certain number of points of the contour or profile of the heart. These apparatuses, however, present several drawbacks. In the first place, they permit to explore a limited number of points on the cardiac wall. In addition, in the case in which the position of the patient during the analysis is not totally correct or in the case in which the film is not properly developed, it is necessary to repeat the determination with the very serious consequence that the patient must be subjected again to a substantial dose of x-rays. In any case, also when the determination has been carried out successfully, the results of the determination do not become immediately available, but become available only after the necessary period of time to develop the film.

More recently, other apparatuses have been proposed, such as the so-called fluoroelectrochemographs which utilize the conventional radiographic apparatus in which behind the fluorescent screen, there is placed a plate of radioopaque material provided with one fissure or window through which, in analogy with the preceding case, x-rays penetrate after having gone through the patient. The difference with the previous apparatus, however, is that behind this fissure, there is placed a photoelectric detecting device, which is connected by means of a device for amplification and filtration to a registering apparatus, the latter consisting exclusively of an electrograph having several styli. The photoelectric detecting apparatus provides at the exit an electric signal as a function of the totality of the variations of luminosity on the fissure or window. In this manner, this apparatus detects, now only the variations due to the displacement of the organ, but also variations of luminosity caused by eventual variations in density of other organs being seen through the interior of the fissure one type of variations being indistinguishable from the others. The tracings which are obtained with the fluoroelectrochemograph do not permit a quantitative correlation between the amplitude of the graph with the actual displacement of the point of the heart being examined.

A common drawback of all the methods and apparatuses discussed hereinabove is that they require that the patient be subjected to a high dose of ionization radiation. Another drawback which is present to a different extent in the different methods is connected with the limited number of utilizable fissures. Consequently, except for the electrochemography, the duration of the registrations results excessively limited. The correlation with the electrocardiogram results very difficult with the methods discussed hereinabove. The mechanical apparatus required to carry out the determinations with the known methods is complex and expensive and the installation must be effected with considerable expenditure of time, every time one wishes to carry out this type of determination which is not too frequent, utilizing a part of the system of radioscopy. Another drawback of all these methods is due to the fact that the operator is subject in part to radiation. For this reason and for other reasons mentioned hereinabove, the chemography carried out with the known methods has been practically abandoned.

An object of the present invention is to provide an apparatus for the detection of the displacement of a body organ, which apparatus eliminates the drawbacks of the apparatuses and methods known in the art.

SUMMARY OF THE INVENTION

The crux of the present invention resides in providing a detecting device for the displacement of a body organ, particularly for use in an assembly for televised radioscopy which assembly comprises (1) means for generating a visual signal corresponding to the image of the body organ in motion being examined and (2) a monitor provided with a screen to which the visual signal is transmitted for reproducing the image of that organ. The detecting device comprises:

at least one input to which in operation the visual signal is supplied;

at least one output which is connected with the input of the monitor;

at least one processing electronic transducer device capable of generating and forming corresponding to the visual signal, a registering signal, the latter being capable to cause on the televised screen of the monitor at least one trace corresponding to at least one point of the profile of the image of the body organ in motion, this tracing having a luminosity different from the luminosity of the surrounding portion of the image;

a second processing electronic detecting apparatus, comprising detecting means capable of supplying at the output an electronic signal, indicative of the amount of the displacement of the tracing with respect to a fixed point in the television screen of the monitor during the movement of the image of the same organ;

visual means and/or registering means connected with the output of the detecting means capable of providing an image of the displacement of the same point of the profile of the body organ being examined.

BRIEF DESCRIPTION OF THE DRAWINGS

Other characteristics and advantages of the device according to the present invention will become more evident from the following detailed description with reference to the accompanying drawings which have been provided by way of illustration, of which.

Figure 1:
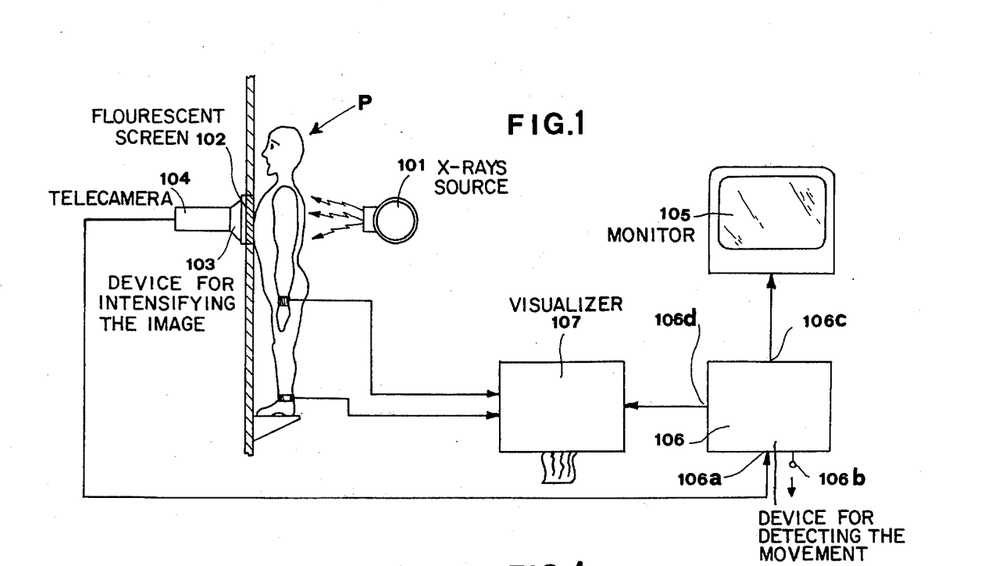
FIG. 1 illustrates schematically an assembly for the televised radioscopy which comprises a detecting device according to the present invention.

FIG. 1 shows a system for televised radioscopy. This system comprises a source of x-rays 101, a fluorescent screen 102, a device for intensifying the images 103 disposed behind the fluorescent screen 102 and connected with a telecamera 104, which provides at the output, a visual signal to a monitor 105 by means of a device for detecting the movements according to the present invention 106.

Numeral 107 designates a visualizer and/or registering device connected with the detecting device 106.

Advantageously, the visualizer and/or registering device 107 for reasons which will appear hereinbelow, consists of an electrocardiograph having multiple tracings of the well-known type.

Figure 2:
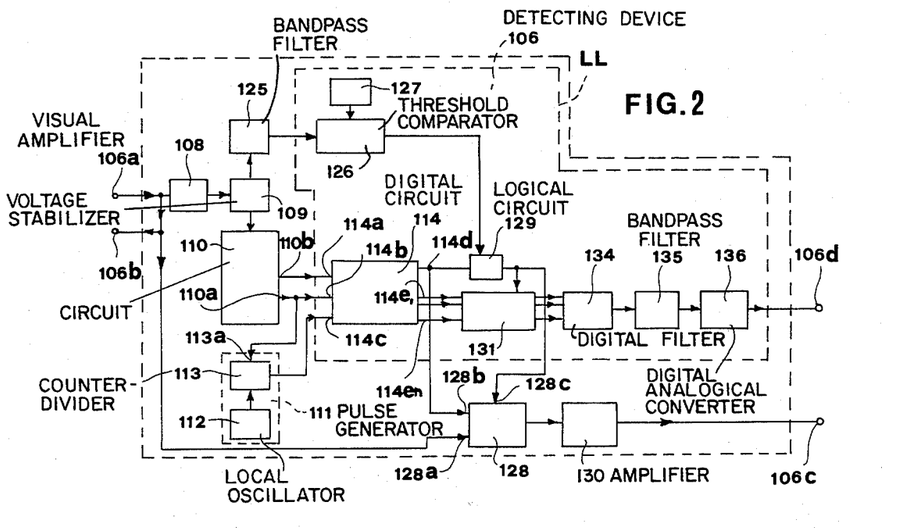
FIG. 2 is a block diagram of the detecting device according to the present invention according to one first embodiment.

The symbol P in FIG. 1 designates a patient who is placed between the source of x-rays 101 and the fluorescent screen 102 in such a manner that the image of the cardiac muscle in motion appears on the fluorescent screen 102. The detecting device 106 is provided with an input 106a connected to the telecamera 104 and three terminals of output which are designated respectively by the symbols 106b, 106c, and 106d. The terminal 106c is connected with the monitor 105 and the terminal 106d is connected to the visualizer and/or registering device 107. The terminal of output 106b is connected as shown in FIG. 2 to the terminal of input 106a. The visual signal supplied by the telecamera 104 reaches terminal 106b for the purpose of making possible to utilize this signal eventually for other instruments.

The input of a visual amplifier 108 is connected with terminal 106a, the visual amplifier 108 having an input impedance substantially higher than the characteristic impedance of the line which connects the telecamera 104 to the detecting device 106 for the purpose of avoiding disturbance of eventual connections with other instruments by means of the output 106b. The visual amplifier 108 is connected to a voltage level maintaining circuit or voltage stabilizer 109 which serves as the circuit which restores continuous voltage. The voltage level circuit 109 has the function of fixing the level of voltage of blanking to a predetermined value of continuous voltage. The voltage level circuit 109 provides the visual signal to circuit 110 which serves as the circuit separating the synchronizing signals. This circuit 110 separates the horizontal or line synchronizing signal and the vertical synchronizing signal from the complete visual signal. The horizontal synchronizing signal and the vertical synchronizing signal are emanated respectively corresponding to the outputs designated by the numerals 110a and 110b.

Figure 3:
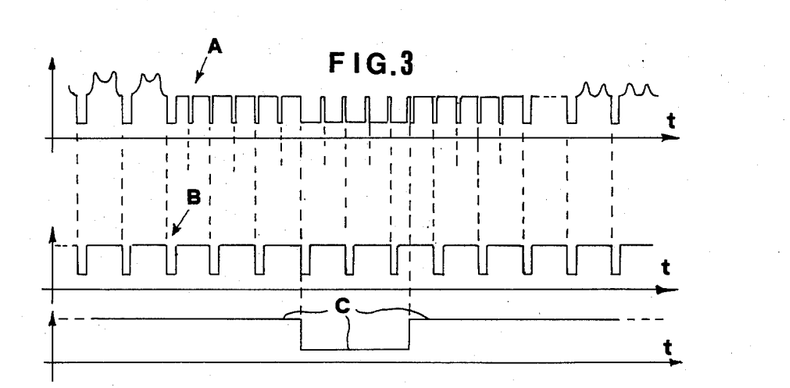
FIG. 3 is a graph which shows the shapes of the waves of the tension of three signals as a function of time in the apparatus according to the present invention.

FIG. 3 illustrates qualitatively three shapes of waves indicated respectively by the symbols A, B, and C and corresponding to the voltage as a function of time respectively of the complete visual signal A supplied at the output by the voltage level circuit 109, the horizontal synchronizing signal B and the vertical synchronizing signal C, which are supplied at the output by the separating circuit of the signals of synchronism 100. Output 110 shown in FIG. 2 of the latter circuit is connected to the input of a pulse generator 111, which generates a shape of waves with pulses of frequency much higher than the frequency of the horizontal synchronizing signal, the output 110a being connected in a manner which will be described hereinbelow in phase with the horizontal synchronizing signal. This pulse generator 111 comprises a local oscillator 112. This local oscillator 112 generates pulses having a much higher frequency such as a frequency of 80 MHz. The output of the local oscillator 112 is connected to a counter-divider 113 which is provided with control output 113a, connected to the output 110a of the separating circuit of the synchronizing signals 110. Every time the counter-divider 113 receives corresponding to the input 113a, a pulse of the horizontal synchronizing signal, it starts to count the pulses provided at the output by the local oscillator 112 and every four pulses being counted, it emits one pulse at the output. To state the matter in different words, in the example being considered, after having received a pulse of the horizontal synchronizing signal, the counter-divider 113 supplies at the output, a signal at the frequency of 20 MHz, connected in phase to the same horizontal synchronizing signal with the maximum phase difference of a period equal to $$[1/80 \cdot 10^{-6}]s = 12{,}5 \text{ ns.}$$

Figure 4:
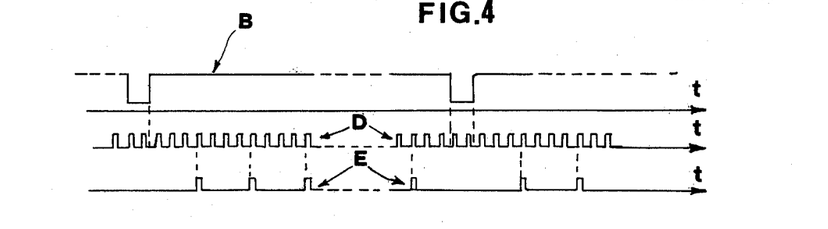
FIG. 4 is a graph which illustrates the shape of the waves of three signals present in the apparatus of FIG. 2.

FIG. 4 shows qualitatively the shape of the wave (1) of the horizontal synchronizing signal (2) of the signal generated by the local oscillator 112 and (3) the signal provided at the output by the counter-divider 113. These three shapes of waves are indicated respectively by the symbols B, D, and E.

Figure 5:
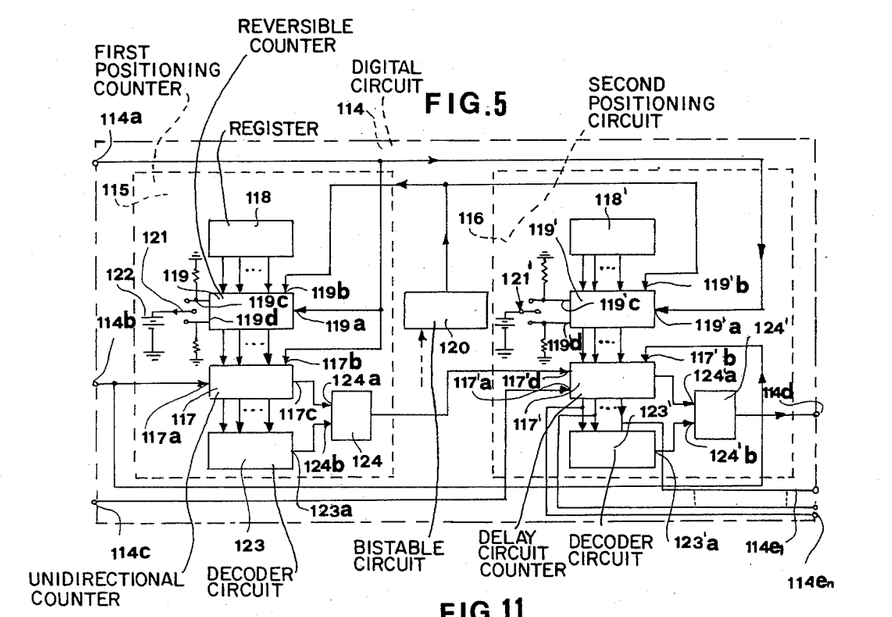
FIG. 5 is a detailed schematic of one part of the apparatus of FIG. 2.

In FIG. 2, numeral 114 designates the total digital progressing circuit which is illustrated in greater detail in FIG. 5. This digital circuit 114 is provided with three inputs 114a, 114b and 114c which inputs are connected respectively to the outputs 110b, 110a of the separating circuit of the synchronizing signal 110 and to the output of the counter-divider 113. The digital circuit 114 serves substantially to generate a registering signal which is intended, as it will be described hereinbelow to be superimposed to the visual signal emanating from the telecamera 104 so that there appears on the screen of monitor 105, a tracing having a luminosity different from the tracing of the portion of the image which surrounds it.

This tracing, as it will be described hereinbelow, in general, has the shape of a rectangle and occupies partially a certain number of lines of the picture presented on the screen of monitor 105. However, the tracing may be reduced simply to a portion of a line or even to a single point. The digital circuit 114 also serves to generate a base of measure according to which the displacements are determined.

Figure 6:
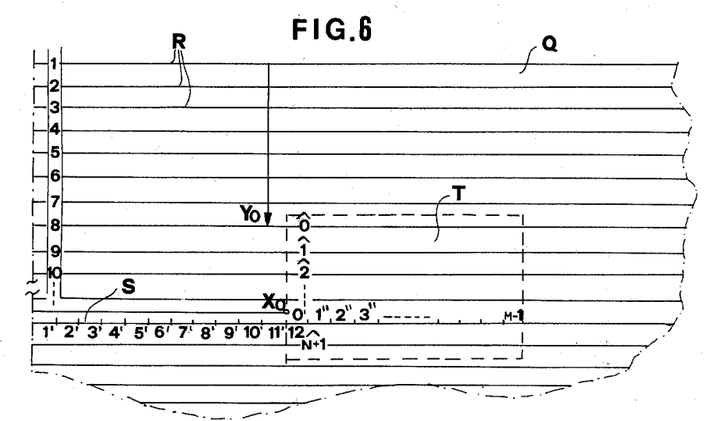
FIG. 6 is a graph which illustrates a rectangular tracing reproduced in the televised screen of a monitor used in the system of FIG. 1.

The construction of the apparatus according to the present invention capable of generating a registering signal so that a rectangular tracing appears on the screen of monitor 105, as shown schematically in FIG. 6, will be described hereinbelow. It should be stated that in FIG. 6, there is illustrated schematically a portion of the televised picture Q of monitor 105. On this portion of the screen, there are shown the lines R which constitute one of the two-half pictures or frames, which contribute to constitute the television picture. The lines are numbered progressively from the top downwardly with numbers 1, 2, 3 . . . The symbol T indicates a rectangular tracing, the boundary in FIG. 6 being a dotted line and shown on the screen of monitor 105 as it will be described hereinbelow. The tracing T extends on a number N of portions of adjacent lines and its vertical position may be represented by the progressive number $Y_o$ which is attributed to the first line from the top on which it extends. In the example illustrated in FIG. 6, $Y_o$ is equal to 8.

The portions of the lines which are enclosed in the tracings T are numbered progressively from the top downwardly with the numbers $$\hat{0}, \hat{1}, \hat{2} \ldots N-\hat{1}.$$

Every line R may be subdivided in elementary segments s (which constitute the unit of measure of the system which in the digital example are determined in length of frequency of 20 MHz of the signal E in FIG. 4), of equal length and numbered progressively from the left to the right with numbers 1', 2', 3'. . .

The position along the lines or the horizontal position of the tracing T may be represented by the progressive number $X_0$ associated to the elementary segment which defines the left boundary of each portion of line enclosed by the same tracing T. In the example illustrated in FIG. 6, $X_0$ is equal to 12. The horizontal dimension of the tracing T may be defined by pre-fixing the numeral M of segments T which each of the line segments comprises. The segments S which constitute each line segment on which the tracing T extends, are numbered progressively with the numbers 0, 1'', 2'', 3'' . . . M−1. The digital circuit 114 comprises as shown in FIG. 5, a first positioning circuit 115 which permits as it will be shown hereinbelow to define and vary the vertical position of the tracing T on the screen Q and a second positioning circuit 116 which permits to define and vary the horizontal position of the same tracing T.

The positioning circuit 115 comprises a unidirectional counter 117 which has the input of control (clock) 117a connected to the terminal of input 114b of the digital circuit 114 and the input of control of the load 117b connected to the terminal of input 114a of the same digital circuit 114. The counter 117 is capable of carrying out cycles of calculations in progression according to a unit from the value 0 to a value Nmax, the latter being an integral number greater than the number of lines which constitute each half of the picture, contributing to form the picture Q on the screen of monitor 105. This count is determined from the horizontal or line synchronizing signal supplied at its input 117a so that this counter will be designated hereinbelow as the "line counter". This counter is connected to a register 118 ad n bit by means of the reversible counter 119 having the input of control (clock) 119a connected to the terminal of input 114a of the digital circuit 114 and the input of control of load 119b connected to the input of delay circuit 120. The delay circuit 120 is connected (not shown), to the feeding line of the device (not shown), and has the purpose of obtaining automatically the loading of the reversible counter 119 with the content of the register 118, while maintaining for a predetermined period of time, the control of load after the necessary voltage supply has been supplied to the device.

The reversible counter 119 is provided with two further inputs 119c and 119d respectively for the control of the increment and decrement of the instantaneous content of the same counter. These inputs 119c and 119b may be connected by means of commutation pulsation device 121 having three positions and an intermediate position of rest to a continuous voltage source 122.

The line counter 117 presents a terminal of output 117c (see FIG. 5), corresponding to which it emits a control pulse at the end of every counting cycle or when the counting reaches the number Nmax. The line counter 117 is further connected to a decoder circuit 123 which is provided with an output terminal 123a corresponding to which it emits a control pulse everytime the counting carried out by the line counter 117 reaches a pre-established value. Numeral 124 designates a bistable circuit, for instance of the flip-flop type having the input set 124a and the clear output 124b connected respectively to the line counter 117 and to the output 123a of the decoder circuit 123.

Figure 7:
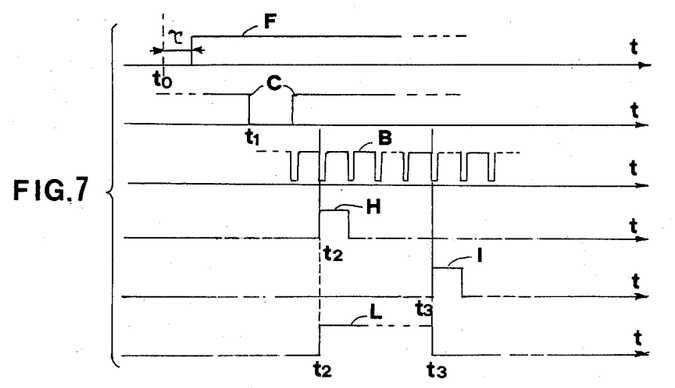
FIGS. 7, 8, and 9 are graphs which illustrate the shape of the wave of other signals generated in the device according to the present invention as a function of time.

Everytime the apparatus of FIG. 1 is operated, it is convenient to register the tracing T in a fixed position of the screen Q of the monitor 105 in a manner which will be described hereinbelow. To this fixed position, corresponds a value $Y_0$ which is pre-established in the construction of the apparatus. For the purpose of determining the beginning of the tracing T in vertical section, starting from the line to which the pre-established number $Y_0$ is associated, it is necessary in the construction of the apparatus to charge or store the value Nmax—$Y_0$ in the register 118 as shown in FIG. 5. During operation, the voltage supply is first of all supplied to the entire apparatus. One assumes that this occurs at a point in time t=$t_0$ (FIG. 7). After a pre-established period of delay τ during which the charging or storage condition prevails by means of the delaying circuit 120 as shown in FIG. 5, the charging or storage condition as shown in FIG. 7 under F which shows the shape of the wave, is removed from the control input when data 119b are fed to the reversible counter 119. As soon as the point in time is t=$t_1$, the first pulse of the vertical synchronizing signal C reaches the input 119a, which is subsequent to the load interval τ, the content of the reversible counter 119 is fed to the line counter 117. This initial content, as it has been discussed hereinabove, is equal to Nmax- $Y_0$.A. Beginning with the point in time $F_1$, the counter 117 starts counting determined from the horizontal synchronizing signal B as shown in FIG. 7 up to the point when the number Nmax corresponds to the point in time $t=t_2$ is reached. In the interval of time between point $t_1$ and point $t_2$ as shown in FIG. 7, the first lines $Y_0$ are represented on the screen Q of monitor 105. Corresponding to the point in time $t=t_2$, the counter 117 emits corresponding to the exit 117c, a control pulse illustrated by the waveshape H in FIG. 7. This control pulse determines the commutation of output of the bistable circuit 124 as it is illustrated by the waveshape designated by the symbol L in FIG. 7. Beginning with the point in time $t_2$, the counting carried out by the counter 117 starts again from the point 0 and continues up to the number N-1, N being as it has been discussed hereinabove, the pre-established number of lines on which the tracing T extends. The decoder circuit 123 is arranged in such a manner as to supply corresponding to the output 123a, a control pulse (waveshape indicated with the symbol I in FIG. 7), when the content of the counter 117 reaches the number N-1 in the point in time $t=t_3$. This control pulse determines a new commutation of the output of the bistable circuit 124 as shown in FIG. 7 by the shape of wave L). In the interval of time between point $t_2$ and $t_3$, the electronic beam describes on the screen Q of monitor 105, the lines on which it has been predetermined that the tracing T be represented. The signal L of FIG. 7 constitutes a qualifying signal, the utilization of which will be described hereinbelow, for the purpose of achieving the tracing T.

The second positioning circuit 116 comprises elements identical to those which constitute the first positioning circuit 115. For this reason, the reference numbers assigned to the elements which constitute the positioning circuit 116 are the same as the numbers assigned to the elements of the circuit 115 with the addition of the symbol ', the only differences between the second positioning circuit 116 and the first positioning circuit 115 are the following:

The inputs 117'a and 117'b of the uni-directional counter 117' are connected respectively to the terminals of input 114c and 114b of the digital circuit 114. The output of the bistable circuit 124 is connected to the input of master reset 117'd of the uni-directional counter 117'. The output of the bistable circuit 124' is connected to the terminal of output 114d of the digital circuit 114 while the n inputs of the decoder circuit at n bit 123' are connected in order to corresponding terminals of output of digital circuit 114 designated with the symbols $114e_1 \ldots 114e_n$.

Figure 8:
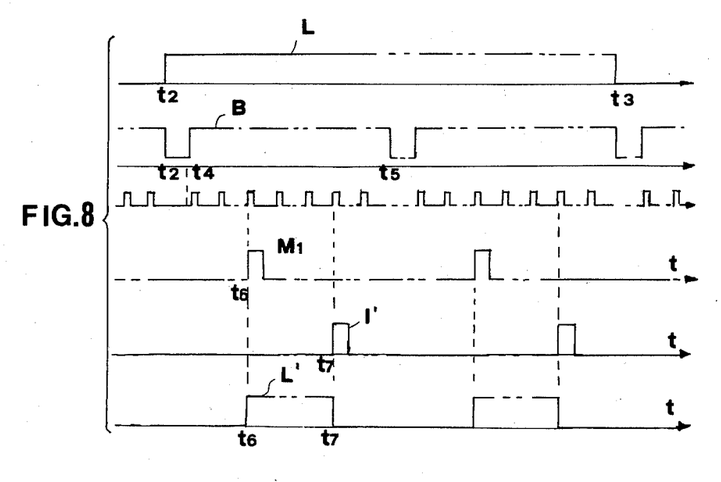

The counter 117' is capable of carrying out counting cycles in progression discontinuously, by a unit, from the 0 value to a maximum value N'max, N'max being an integral number greater than the number of segments s according to which, as it has been discussed hereinabove, each line of the picture ideally may be divided. This count is determined from the signal provided at the output of the pulse generator 111 (FIG. 2), this signal having a frequency much higher than the horizontal synchronizing signal and being in phase with the latter with a determined accuracy. The sub-division of each line R in segments s is in reality carried out, not in space, but in time, in the manner which will be described by reference to the waveshapes shown in FIG. 8. In FIG. 8, the waveshape designated by the symbol L, corresponds on an enlarged time scale to the waveshape indicated in FIG. 7 with the symbol L and corresponds to the qualifying signal provided in operation at the output of the bistable circuit 124 in the period of time between the instance $t_2$ and $t_3$ on the screen, during which the N lines corresponding to which the tracing must be registered, are shown on the screen. When the signal at the output of the bistable circuit 124 as shown in FIG. 5 is at a lower level, it prevents the functioning of the counter 117' making the output equal to 0. Beginning from the point in time in which $t=t_2$, up to the time when $t=t_3$, the counter 117' is qualified to counting performed by the signal supplied at the output of the bistable circuit 124. Subsequently, during the interval between $t=t_2$ and $t=t_4$, the horizontal synchronizing signal B determines the load of the counter 117' of the content of the register 118' through the reversible counter 119'. Beginning from the point in time $t_4$ up to the point in time $t_5$, the counter 117' carries out a counting to the frequency of the signal supplied at the output by the pulse generator 111, this counting constituting a sub-division of the interval $t_5-t_4$ in a succession of time sub-intervals corresponding to the segments or points S, in which ideally each of the lines R of the picture Q may be sub-divided. For this reason, the counter 117' is called "point counter".

As it has been mentioned hereinabove, every time the apparatus of FIG. 1 is operated, it is convenient that the tracing T be registered in the manner which will be described hereinbelow in a fixed position of the screen of monitor 105. A particular value of $X_0$ and a particular value of $Y_0$ previously established corresponds to this fixed position. For the purpose of determining the beginning of the formation of the tracing T on the pre-established lines, starting from the point to which the pre-established value of $X_0$ is associated, it is necessary in the construction of the apparatus to record in the register 118', the value N'max-$Y_0$. During the operation of the apparatus in the interval of time between $t_2$ and $t_4$, the counter 117' is charged with the above value N'max-$X_0$. Beginning with the point in time $t_4$, the counting begins and the counting continues up to the point in time $t_5$; when the value N'max corresponding to the point in time $t_6$ is reached, the counter 117' supplies, corresponding to the output 117'c, a control or command pulse which is indicated in FIG. 8 with the symbol $M_1$ to the bistable circuit 124', the output of which changes level as shown in FIG. 8 by the shape of the wave $L_1$. Beginning with the point in time $t_6$, the counter 117' continues the counting beginning with 0 and at the point in time $t_7$, reaches the value M-1, M being the pre-established number of "points" which defines the horizontal dimension of the tracing T. The decoder circuit 123' is so predisposed as to supply, corresponding to the output 123'a, a control or command pulse (see the waveshape indicated in FIG. 7 by the symbol I'), when the content of the counter 117' reaches the number M-1 (FIG. 8). This control pulse determines a new commutation of output of the bistable circuit 124' as it is shown by the shape of the wave L' in FIG. 8. The steps described with reference to the time interval $t_1-t_4$ are repeated within the interval $t_3-t_2$ for a number of time equal to N, or equal to the number of the line segments which contribute to constitute the tracing T.

The steps described hereinabove are repeated obviously for each half of picture which is gradually produced on the screen Q of monitor 105. The visual signal at the output of the restorer circuit of the continuous tension 109 is supplied to a bandpass filter 125, shown in FIG. 2. In use this filter is convenient because the use of the intensifier of images 103 causes the presence of a substantial noise corresponding to the visual signal and this noise unless it is conventionally softened, renders the information with respect to the image in motion contained in the visual signal, not suitable for practical utilization. The filter 125 eliminates the noise components of high frequency. The visual signal at the output of the filter 125 has a profile of the type illustrated qualitatively by the waveshape A' with respect to one line in FIG. 9. The amplitude of this waveshape is substantially proportional to the luminosity of the image of the cardiac muscle which appears on the fluorescent screen 102 along the corresponding line. In particular, in the portion of the signal corresponding to a line of the image in correspondence to the cardiac muscle, one may substantially distinguish three zones. The central zone indicated by the symbol I in FIG. 9, corresponds to an intensity of signal of luminosity lower than the threshold $V_s$ and corresponding to the image of the heart which on the fluorescent screen 102 determines the formation of an image which is much darker with respect to the background. The two lateral zones indicated by the symbol II correspond to the lighter background and in this zone, the amplitude of the signal of luminosity results substantially superior to the value of the threshold $V_s$. The signal emitted at the output by the filter 125 is supplied to the threshold comparator 126 of the type which is well-known which supplies at the output a pulse indicated by the symbol i in FIG. 9, every time the visual signal A' goes through the level of the threshold $V_s$. This threshold comparator 126 is provided with means for varying the threshold level $V_s$ of the type which is well-known, which means are indicated in general by the symbol 127.

Figure 9:
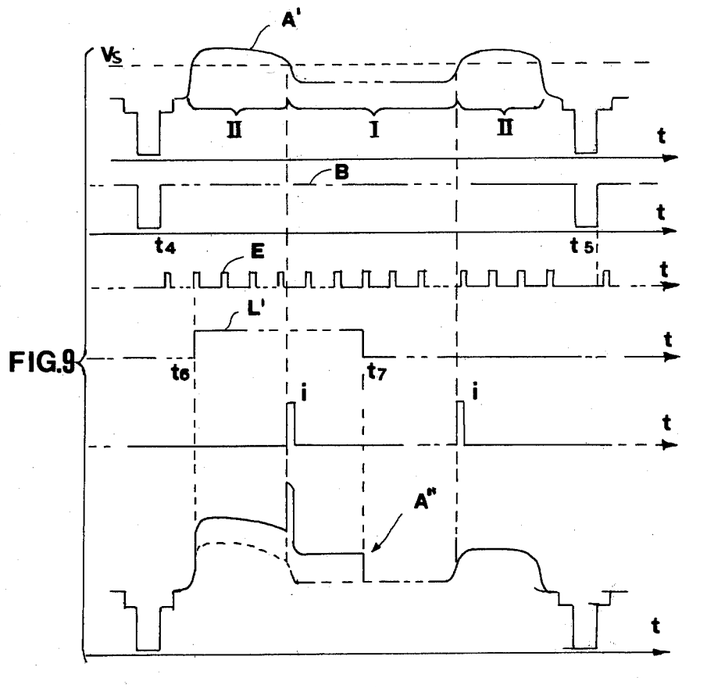

The visual signal fed in actual use to the input 106a, of the apparatus according to the invention as shown in FIG. 2 is fed in addition to a first input 128a of an additional adder circuit 128 which has a second input 128b connected with the output 114d of the digital circuit 114. The output 114d of the digital circuit 114 and the output of the threshold comparator 126 are connected to corresponding inputs of the logical circuit 129 of the type having a gate which every time a qualifying signal L' as shown in FIGS. 8 and 9 is present at the output 114d of the digital circuit 114, transfers at the output only the first pulse i, which is supplied by the threshold comparator 126. The logical circuit 129 may consist of a bistable circuit. The output of this circuit 129 is connected to a third input 128c of the adder circuit 128. On the basis of the discussion hereinabove, it is clear that in actual operation, at the output of the adder circuit 128, there results the signal indicated in FIG. 9 by the symbol A''. This signal consists of the sum of the visual signal, of the registering signal and the qualifying signal L (which is intended to cause a portion of the tracing T on each of the pre-selected lines) and the pulse i supplied by the threshold comparator 126. The latter pulse registers finally the point of the image of the profile of the heart in the interior of each portion of line which constitutes the above tracing T. The signal at the output of the adder circuit 128 is fed after amplification through the amplifier 130 to the monitor 105 through the output 106c. The latter supplies, therefore, in actual operation, images of the type illustrated qualitatively in FIG. 10. On the screen Q of monitor 105, there appears a portion indicated by the symbol PR having a much higher luminosity and corresponding to a portion of the profile of the heart which is registered in the interior of a rectangular tracing T of a luminosity which is much more modest relatively, but still superior to that of the remaining part of the image presented on the screen Q.

Figure 10:
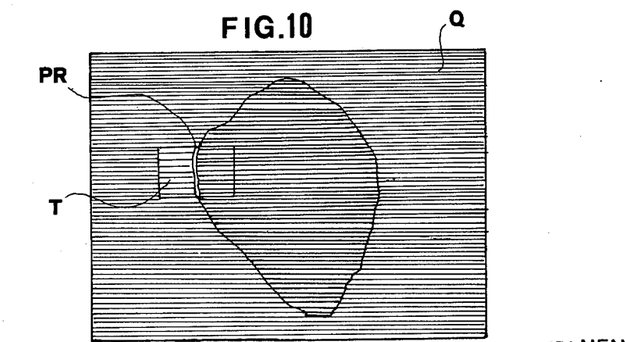
FIG. 10 illustrates the televised image which appears on the screen of the monitor by means of the device according to the present invention.
Figure 11:
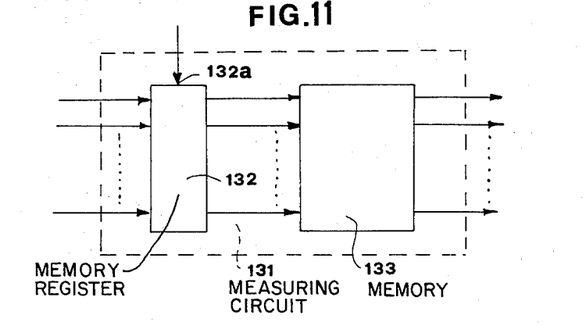
FIG. 11 illustrates a further portion of the apparatus of the detecting device of FIG. 2.

The outputs $114e'$ and $114e_n$ of the digital circuit 114 in FIG. 2 are connected to corresponding inputs of a detecting and measuring circuit 131 which is illustrated in greater detail in FIG. 11. This circuit comprises an n bit memory register 132, the command input of which (clock 132a) is connected to the output of the logical circuit 129 as shown in FIG. 2. When the logical circuit 129 receives the first useful pulse supplied at the output by the comparator 126, it transfers this pulse to the input 132a of register 132 in which the instantaneous content of counter 117' is stored. On the basis of the discussion hereinabove with respect to the manner of counting carried out by the counter 117', it results evident that for each portion of the line which constitutes the tracing T, the content of the counter 117' at the time in which the register 132 receives a control pulse from the logical circuit 129, results equal to the number of points or segments $\tau$, comprised between the beginning of each individual line portion of the tracing T and the point of the contour of the heart registered on each of the same line portions. Every time the register 132 receives a command or control pulse, it acquires the instantaneous content of the counter 117' and transfers the preceding value to a memory 133. This memory retains the N values which are memorized in it corresponding to the N line portions constituting the tracing T produced in every half picture and it transfers these values in every half picture to a digital filter 134 shown in FIG. 2 of a type well-known and capable of carrying out a programmed combination of the values accumulated in its memory during the exploration of the tracing T carried out for each shape of the frame or half square. This programmed combination is calculated in such a manner as to supply the indication of the movement of the central point of the N points of the tracing PR as shown in FIG. 10 for the purpose of increasing the ratio signal/noise. The digital filter 134, therefore, supplies the value of this programmed combination in digital form to a digital/analogical converter 135. The analogical signal supplied at the output by this converter is transferred through a bandpass filter 136 to the visual displaying and/or register 107 shown in FIG. 1 which supplies a representation, for instance of the graphic type of the displacements of the median point of the portion PR of the profile of the heart registered in the interior of the tracing T. In actual usage, the patient P is disposed in the manner illustrated schematically in FIG. 1. The operator controls the position of the patient to make sure that it is correct in the monitor 105, so that in this monitor 105, the image of the cardiac muscle in motion is properly visible. On the screen of the monitor 105, overlapped with the image taken by the telecamera, appears the tracing T in a fixed position. The operator has the possibility of displacing this tracing in every portion of the screen simply by acting on the commutators at three positions 121 shown in FIG. 5 by variations of the vertical position of the tracing and by means of 121', by variation of the horizontal position of the tracing. The tracing, therefore, will be positioned in such a manner that it intercepts the profile of the heart. On account of the unavoidable distortions on the signal of luminosity produced by the intensifier of image 103, it is necessary to regulate the limiting threshold of intervention of the comparator 126. This adjustment may be carried out manually by the operator merely be observing the monitor. The threshold results correctly placed when the tracing PR registered in the interior of the tracing T appears exactly overlapped to the portion of the profile of the heart on which the tracing T is superimposed. After these adjustments have been made, the display and/or register 107 may be activated, this register 107 providing directly for the time/graphic of the displacements of the central point of the portion PR of the contour of the heart, which is shown in the tracing T.

As it has been described hereinabove, the visualizer and/or register 107 may consist conveniently of an electrocardiograph. In fact, it is of great interest within the scope of diagnostic analysis to dispose of time graphics of the displacements of the cardiac walls connected with conventional electrographic tracings. For this reason, if the registering apparatus 107 consists of an electrocardiograph having multiple tracings, it is possible to carry out the simultaneous detection of an electrographic tracing and one or more temporal graphics of the displacements of a cardiac wall.

Figure 12:
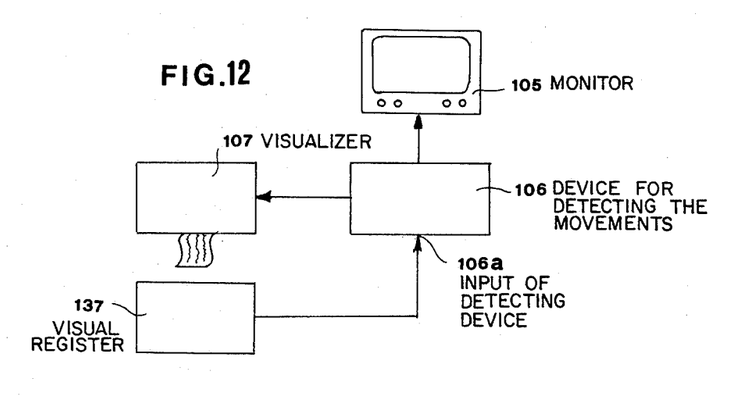
FIG. 12 illustrates a modification of the system illustrated in FIG. 1.

In FIG. 12, a modification of the system illustrated in FIG. 1 is shown. According to this modification, the telecamera 104 is substituted by a visual register 137 in which a continuous sequence of radioscopic images of an organ in motion has been registered, for instance, the heart. The visual register 137 is connected as described hereinabove, to the input 106a of the detecting device 106, which is connected to the monitor 105 and to a visualizer and/or register 107.

Figure 13:
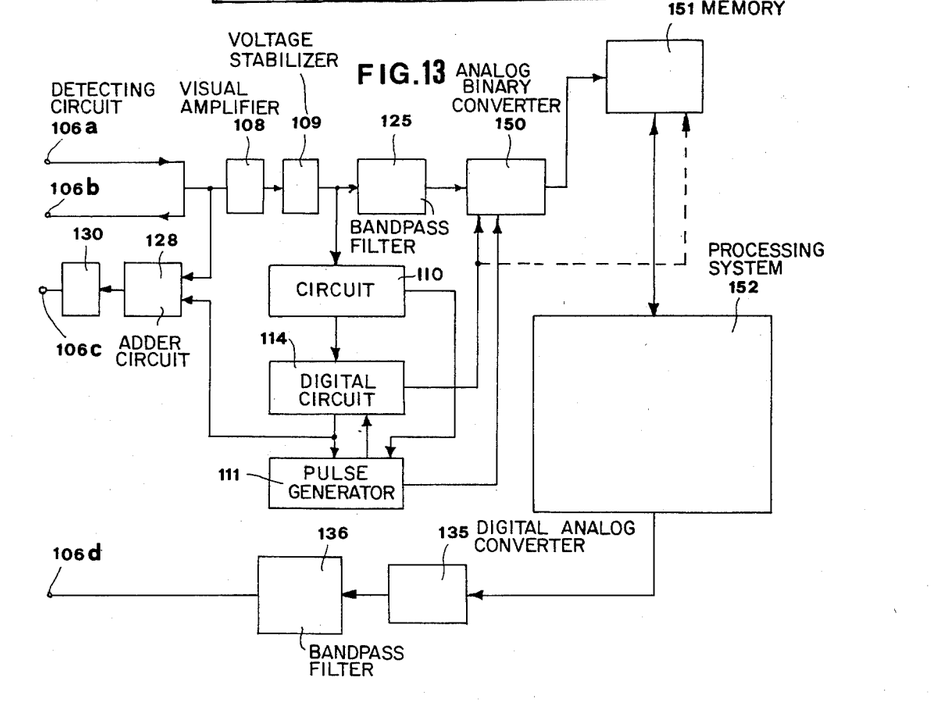
FIG. 13 is a block diagram of a modification of the assembly illustrated in FIG. 2.

In the embodiment of FIG. 13, a modification of the apparatus illustrated in FIG. 2 is shown. The same numerals used in FIG. 2 have been assigned to the several elements of the assembly of FIG. 13 when they correspond in function. The output of the bandpass filter 125 is shown connected to an analog-binary converter 150 which transforms the analog visual signal A into a corresponding sequence of binary numbers. This analog-digital converter 150 carries out conversions which are determined from the signal E (20 MHz) emanating from the pulse generator 111 after the qualifying signal L' has been received by the digital circuit 114.

This converter 150 is connected to a memory 151 in which the information of the portion of the image corresponding to the tracing T is stored. The memory 151 is connected to a processing system 152 of a type well-known which is programmed according to any one of known methods for the extraction of the information relative to the profile of an image, this information corresponding to the tracing PR described hereinabove. This processing system 152 ideally is programmed according to the measure of the displacements of a point of the same tracing according to any direction with respect to any pre-established reference point.

The processing system 152 provides an indicative signal of these displacements to the digital analog converter 135.

Although in the description hereinabove, reference has been made to an apparatus which registers a single time graphic of the displacements of a point or a portion of the contour of a body organ, it is manifest that the apparatus according to the present invention permits to register time graphics and displacements of several points or portions of the contour and the body organ being examined. For this purpose, it is sufficient to duplicate or triplicate, etc. the portion of the detecting circuit 106 comprised in the interior of the dotted line indicated by the symbol LL in FIG. 2.

The device according to the present invention offers several advantages. First of all, it permits to decrease the intensity of radiation, (X-rays) and the period of exposure of the individual to this radiation with consequence decrease of the total quantity of rays being absorbed. In contrast with known devices, the apparatus according to the present invention may be easily and repeatedly installed because it does not require any modification of the known radioscopic apparatuses and may remain always connected to the known apparatuses also during other examinations which do not require its operation.

In contrast with other devices known in the art, the system according to the present invention permits the total screening of the operator.

Still another advantage resides in the possibility of carrying out the examination by placing the patient in any position.

Still another advantage consists of the great accuracy of the apparatus according to the present invention because this system is based upon an objective measure rather than a subjective analysis on the part of a highly specialized operator which is the case with the known apparatuses used for roentgenchemography. Further, the system according to the present invention according to the embodiment illustrated in FIG. 1, permits to obtain the results immediately without any delay and in cases in which the position of the patient during the analysis is not the most convenient, it is possible to provide immediately for the correction, thus avoiding the inconvenience of repeating the analysis. Obviously, several embodiments may be realized always within the scope of the present invention and the details of constructions may always be varied with a great deal of latitude by keeping in mind that the description is not intended to be limitative.

According to a practical embodiment of the apparatus, it has been particularly useful to register the portion of the central line of the tracing T, the intersection of which with the tracing PR indicates the point of the profile, the displacement of which is being measured. This may be obtained easily for instance by using a further decoder circuit (the central line of tracing T9 connected in parallel to the decoder circuit 123, (FIG. 5). This further decoder circuit qualifies an additional gate circuit having an input connected to the output of the bistable circuit 124'. In this manner, there is obtained from the output of the gate circuit, the only signal L' corresponding to the central line of the tracing T. This signal is supplied to a further input of the adder circuit 128 determining the further intensification of this portion of the central line of the tracing T.

What is claimed is:

1. In an assembly for televised radioscopy which comprises a source of X-rays (101) means for generating a visual signal corresponding to the contour of image of the body organ in motion being examined (102, 103, 104) and a monitor provided with a screen (105), said visual signal being provided to said screen for reproducing the image of said body organ and a detecting device for the displacements of said body organ;

the improvement which comprises a detecting device (106) which has an input (106a) to which said visual signal (A) is supplied, at least one output (106c) which is intended to be connected to the input of said monitor 105, a first processing electronic transducer device (108,109,125,126,127,128,130), capable of generating and overlapping a registering signal i which is overlapped with said visual signal (A), said registering signal i being capable of causing at least one tracing PR on the televised picture Q of the monitor 105, said tracing corresponding to at least one point of said contour of the image of the body organ in motion, said tracing PR having a luminosity different from the luminosity of the surrounding portion;

a second processing electronic device comprising detecting means (110, 111, 114, 131, 134, 135, 136) capable of supplying at the output an electric signal indicative of the amount of the horizontal displacement of said tracing PR starting from a reference point T which is fixed with respect to the televised picture Q of the monitor 105 during the movement of the image of the same body organ;

registering means (107) connected to the output of the detecting means (110, 111, 114, 131, 134, 135, 136) and capable of supplying a representation of the displacement of said point of the contour of the body organ being examined.

2. The assembly according to claim 1 wherein the signal i generated by said first processing electronic device (108, 109, 125, 126, 127, 128, 130) is capable of causing on the televised picture Q of monitor 105, a tracing PR consisting of at least one point.

3. The assembly according to claim 1 wherein the signal i generated by said first processing electronic device (108, 109, 125, 126, 127, 128, 130) is capable of causing a tracing PR on the picture Q of monitor 105, said tracing PR comprising a plurality of point adjacent among themselves having substantially equal luminosity, each one parallel to a subsequent line R of the picture Q of monitor 105.

4. The assembly according to claim 2 which is provided with means (127) adjusting the position of said tracing PR on the picture Q of monitor 105, said means being manually operated.

5. The apparatus according to claim 1 wherein said detecting means of said second electronic processing device (110, 111, 114, 131, 134, 135, 136) are capable of detecting the horizontal displacement of said tracing PR by measuring the interval of time in actual operation between the moment in time when a point of said tracing PR is generated and a pulse of the horizontal or line synchronizing signal B with respect to the line to which said point of tracing PR belongs.

6. The assembly according to claim 4 wherein a second processing electronic circuit (110, 111, 114, 128) is provided, said circuit being capable of generating and being capable of overlapping a second registering signal (L') to the visual signal A, said second registering signal L' being capable of causing the appearance of a second tracing T in a predetermined portion of the picture Q of the monitor 105, said second tracing constituting said fixed reference point and having a luminosity different from the luminosity of the portion surrounding the image, the picture Q has lines R, said second tracing T is constituted by a portion of the lines R of the picture Q of the monitor 105 on which during operation said first tracing PR is produced.

7. The assembly according to claim 6 wherein said registering signal (L') generated by said second electronic processing circuit (110, 111, 114, 128) is capable of generating a portion of said second tracing T in each line R of a pre-established number of lines R of the picture Q of the monitor 105, said portions being generated after a pre-established period of time, beginning with the pulse of horizontal or line synchronizing signal R to which said portions respectively belong.

8. The assembly according to claim 7 wherein said first tracing PR has a maximum horizontal amplitude and said second tracing T has a horizontal extension greater or equal to the maximum horizontal amplitude during operation of said first tracing PR during movement of the image of the body organ being examined.

9. The assembly according to claim 7 which comprises additionally manually operated regulating means (121, 121') to vary the position of said second tracing T in the interior of the picture Q of monitor 105.

10. The assembly according to claim 9 wherein said second detecting means (131, 134, 135, 136) are capable of detecting the horizontal displacement of said first tracing PR by measuring the time interval in actual operation between the point in time when a point of said first tracing PR is generated and a point in time when said second tracing T belonging to the same line R is generated.

11. An assembly according to claim 1 wherein said first electronic processing circuit (108, 109, 125, 126, 127, 128) comprises:

a voltage level maintaining circuit (voltage stabilizer) (109) at the input thereof said visual circuit A is supplied;

at least a threshold comparator of 126 connected to said voltage level maintaining circuit (109), said comparator (126) supplying at the output a signal every time the visual signal A goes through a threshold level ($V_{sS}$) corresponding substantially to the luminosity of the point of the body organ, the displacement of which is being examined.

12. The assembly according to claim 11 wherein a band-pass filter (125) is interposed between the output of said voltage level maintaining circuit (109) and the input of said comparator (126).

13. The assembly according to claim 11 wherein said threshold level of said comparator 126 is manually adjustable.

14. The assembly according to claim 6 wherein said second processing circuit additionally comprises a circuit which separates the synchronizing signals (110) provided with an input to which in actual operation is supplied said visual signal A, said separating circuit is provided with a first and second output (110a, 110b) which provide in actual operation, the horizontal or line synchronizing signal B and respectively the vertical synchronizing signal C, first counting means (117) connected to said first input (110a) of the separating circuit of the synchronizing signal (110) capable of carrying out a counting on the basis of the frequency of the line synchronizing signal B in each time interval comprised between pairs of successive pulses of the vertical synchronizing signal C, first command means (123, 124) connected to said first counting means (117) capable of supplying at the output a qualifying signal having a length equal to the period of time between the points in time in which the counting carried out by the first counting means (117) reaches a first and a second pre-established value, corresponding to the first and respectively to the last line of the picture on which said second tracing T is achieved.

15. The assembly according to claim 14 wherein said second processing circuit comprises;

a pulse generator (111) of a pre-established frequency, said frequency being greater than the frequency of the horizontal or line synchronizing signal B, second counting means (117') connected to the pulse generator (111) intended to start counting on the basis of the frequency of the signal supplied by the pulse generator (111) each time said pulse generator initiates a period of the horizontal or line synchronizing signal B in the time interval during which said first command means (123, 124) supply at the output, the qualifying signal (L);

second means of command (123', 124') connected to said second counting means (117') capable of furnishing at the output a qualifying signal (L') of length equal to the period of time between the points in time in which each counting carried out by said second counting means 117', reaches a first and respectively a second pre-established value, said qualifying signal (L') constituting said second registering signal.

16. The assembly according to claim 15 wherein said pulse generator (111) is connected in phase with the horizontal synchronizing line signal B.

17. The assembly according to claim 16 wherein said pulse generator (111) comprises a local oscillator (112) of frequency higher than the frequency of the horizontal synchronizing line signal B and a counter-divider (113) connected to said local oscillator (112), said counter-divider having the command input (113a) connected with said input (110a) of the separating circuit.

18. The assembly according to claim 14 wherein said first counting means comprises:

a uni-directional counter (117) having the control clock (117a) and the input of command of the load (117b) connected respectively to the first and second output (110a, 110b) of the separating circuit of the signal of synchronism (110);

memory means (118) connected to said uni-directional counter (119) capable of loading in said uni-directional counter (117) a pre-established numerical value at the beginning of each counting cycle.

19. The assembly according to claim 9 wherein said first counting means additionally comprise reversible counter (119) interposed between said memory means (118) and said uni-directional counter (117) having the input of control (119a) connected to said output (110a) of the separating circuit of the signals of synchronism (110).

20. The assembly according to claim 15 wherein said second counting means comprises a uni-directional counter (117') having the input of control (117'a), the principal 0 point (117'd) and the input of command of load (117'b) connected to said generator of inpulses (111), to the output of said first command means (123, 124) and to said first output (110a) of the separating circuit of said signals of synchronism (110);

memory means (118') connected to said uni-directional counter (117') capable of loading in said uni-directional counter (117'), a pre-established numerical value at the start of each counting cycle.

21. The assembly according to claim 9 wherein said second counting means comprises additionally a reversible counter (119') interposed between said memory means (118') and said uni-directional counter (117') having the input of control (119'a) connected with said output (110b) of the separating circuit of the synchronizing signals (110).

22. The assembly according to claim 14 wherein said first and second means of command each comprises a decoder circuit (123, 123') and a bistable circuit (124, 124').

23. The assembly according to claim 22 wherein said detecting means comprises:

a logical circuit (129) connected to said threshold comparator (126) and to the output of said second means of command (123', 124');

a memory register (132) connected to said uni-directional counter (117') belonging to said second counting means and capable of memorizing the instantaneous content of said uni-directional counter (117') when said counter receives corresponding to its input of control (132a), a pulse (i) supplied at the output of said threshold comparator circuit (115);

memory means (133) connected to said register (132) and capable of memorizing a pre-determined number of data supplied by said register (132);

a digital processing circuit (134) capable of supplying at the output digital data corresponding to a programmed combination of pre-established type of data stored in said memory means (113) and a digital/analogical converter (135) connected to the output of said digital processing circuit (134).

24. An assembly according to claim 1 which comprises:

an analogical/digital converter (150) which in actual operation is supplied with said visual signal, memory means (151) connected to said analogical/digital converter (150);

programmable processing means (152) connected to said memory means (151), arranged to carry out the extraction of the information relative to the contour of an image and the measure of the displacements of at least one point of said contour with respect to a fixed reference point;

a digital/analogical converter (135) having the input connected to said programmable processing means (152) and the output is connected to said visualizer and/or registering means (107).

25. An assembly for televised radioscopy according to claim 1 which comprises means for generating image signals capable of generating a visual signal corresponding to the image of a body organ in motion and a monitor provided with a screen to which said visual signal is provided for the reproduction of the image of said organ, device detecting the movements of said body organ (106), said detecting means (106) being interposed between said means capable of generating the signals of image (101, 102, 103, 104, 137) and said monitor (105).

26. The assembly according to claim 25 to which is connected an electrocardiograph for the simultaneous carrying out of radioscopic examination and electrocardiographic analysis said registering means contained in said detecting means consisting of said register (107) comprised in said electrocardiograph.

27. The assembly according to claim 25 wherein said means generating the signal of image comprising a telecamera (104) and an intensifier of image (103).

28. The assembly according to claim 25 wherein said means generating said signals of image comprise a visual register (137).

* * * * *